UNITED STATES PATENT OFFICE.

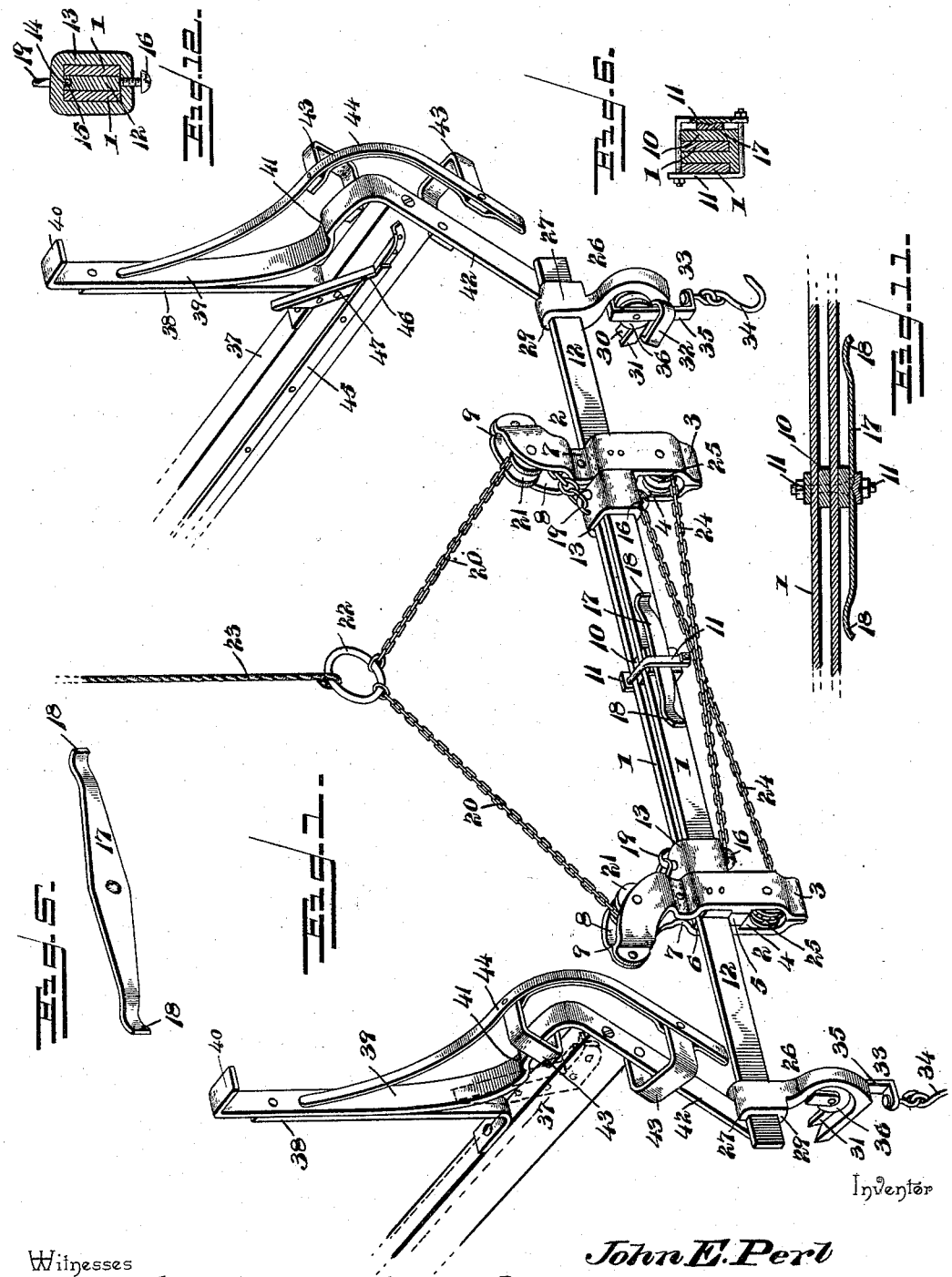

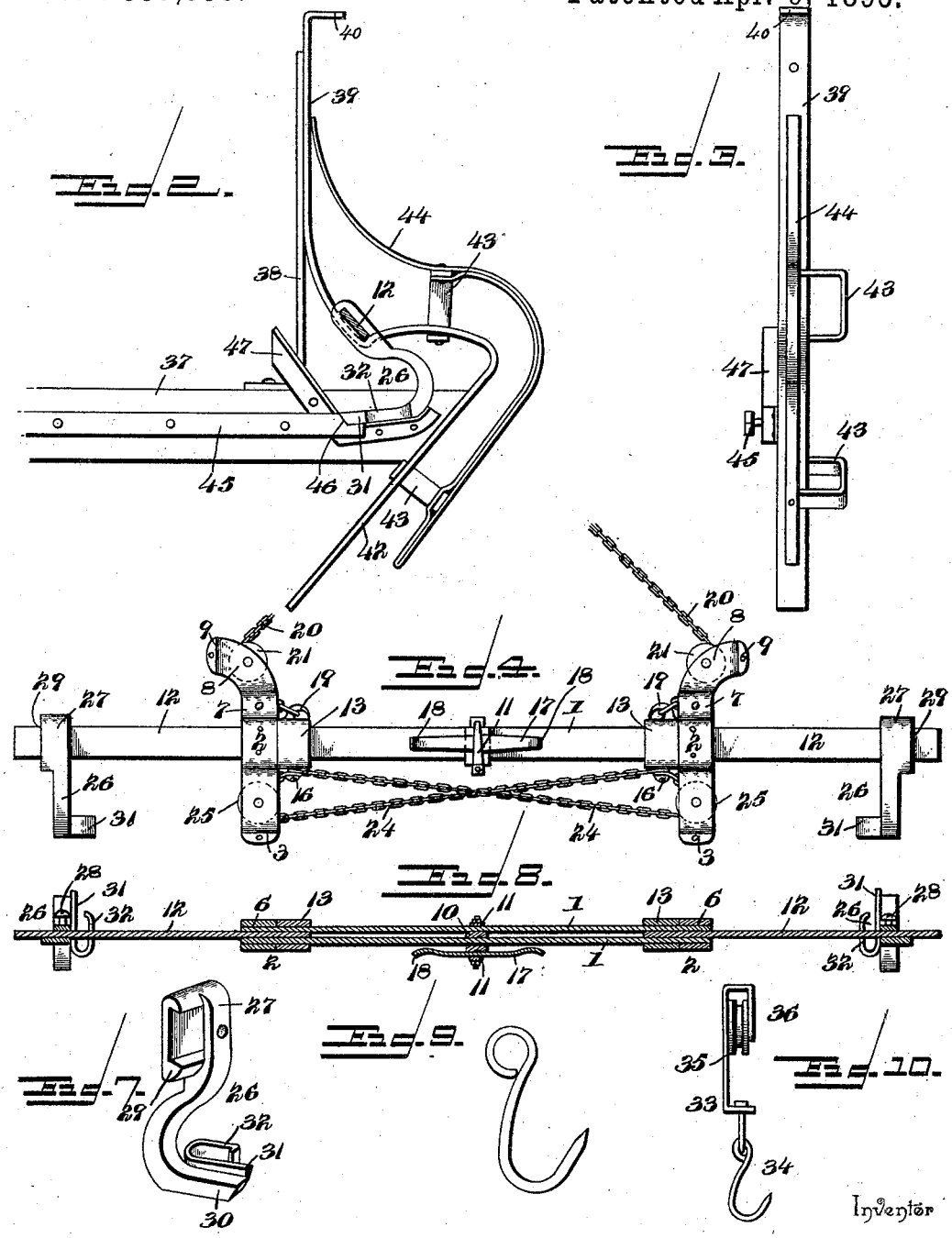

JOHN EVARISTE PERL, OF OSAGE MISSION, KANSAS.

ANIMAL ELEVATING AND SUSPENDING APPARATUS.

SPECIFICATION forming part of Letters Patent No. 537,355, dated April 9, 1895.

Application filed June 19, 1894. Serial No. 515,068. (No model.)

*To all whom it may concern:*

Be it known that I, JOHN EVARISTE PERL, a citizen of the United States, residing at Osage Mission, in the county of Neosho and State of Kansas, have invented a new and useful Animal Elevating and Suspending Apparatus, of which the following is a specification.

The invention relates to an improved device for elevating animals in butchering establishments, and for guiding the elevating apparatus into engagement with a track or way upon which the animal may be placed so that it can be conveyed to another part of the building.

The object of the invention is to provide a device for attachment to the animal, and one which will be capable of spreading the animal's legs simultaneously with the raising operation.

A further object is to provide improved means for guiding the animal when attached to the above device upon the usual tracks of slaughter houses.

To these ends the invention consists in certain novel features of construction and combination and arrangement of parts as will be more fully described hereinafter and finally embodied in the claims.

In the accompanying drawings: Figure 1 represents a perspective view of an elevating apparatus constructed after the manner of my invention, and showing it co-operating with the apparatus for guiding it to the track; Fig. 2, an enlarged side elevation of one end of the guiding apparatus; Fig. 3, an end elevation thereof; Fig. 4, an enlarged side elevation of the elevating and spreading apparatus; Fig. 5, a detail perspective of the spring-plate for holding the spreading arms in position; Fig. 6, a detail section taken through said spring when in adjustment; Fig. 7, a detail perspective of one of the hooks which are fixed to the spreading arms; Fig. 8, a longitudinal and horizontal section of the spreading and elevating apparatus; Fig. 9, a view of a modified form of animal-suspending hook; Fig. 10, an end elevation of the roller frame and its attached hook for use on the spreading arms; Fig. 11, a detail section taken longitudinally with the spring of Fig. 5; Fig. 12, a detail cross-section of one of the collars which are secured to the extension arms.

I will first describe the apparatus for elevating the animal and for simultaneously spreading its legs. This consists of two longitudinal side bars 1, provided with the end pieces 2, which end pieces are one for each pair of ends of the side bars, and which are formed of two duplicate steel plates. The plates composing the end pieces 2 are first bent toward each other, at 3, so that they may be connected together. Above the bend 3 the plates bulge outwardly to form openings 4. Just above the openings 4 the blocks 5 are respectively arranged, thereby inclosing the openings. The plates of the end pieces 2, at points above the blocks 5, are continued apart so as to form the openings 6, through which openings the respective ends of the side bars 1 pass, and in which they are secured by suitable rivets or other fastening devices. The size of the openings 6 is great enough to leave a space between the side bars 1, and this for a purpose which will be hereinafter explained.

Directly above the openings 6 the plates of the end pieces 2 converge, or extend inwardly to form the bends 7, where they are joined to each other by rivets or other fastening devices. Above the bends 7 the plates of the end pieces again spread or bulge to form the third opening 8, while the upper extremities of the plates converge at the point 9 and are there secured to each other again. The upper ends of the plates of the end pieces bend outwardly longitudinally with the side bars, so that the openings 8 will be offset from the extremities of the side bars, and this for a purpose hereinafter explained.

Located partially between the side bars 1, and midway their ends, is the block 10, which is held in place by the clamps 11. 12 indicates the extension arms, which are two in number and which are located between the side bars 1 and one on either side of the block 10, they being so arranged that they will be capable of free longitudinal movement between the bars. The arms 12 are retained in their position between the bars 1, and at the outer ends of the latter, by means of the plates composing the end pieces 2; the arms being passed through the openings 6 in the space between the ends of the side bars, as has been explained before.

Fixed to the inner ends of the arms 12, and embracing the side-bars 1 so as to be capable of free movement thereon, are the collars 13, which are one for each arm and which are provided at their upper ends with the internal and longitudinal ribs 14, which are adapted to fit into the corresponding grooves 15, of the respective arms 12. Operating in the opposite ends of the collars 13 are the set-screws 16, which pass through the collars and into engagement with the under or lower edges of the arms 12, thereby pressing said arms into engagement with the upper ends of the collars and rigidly connecting the two parts.

Fixed to the outer side of the apparatus, and to one of the side bars 1, is the spring plate 17, which is held in place by the clamps 11, and which extends longitudinally with the side arms. The ends of the plate 17 are bent outwardly to form the noses 18, and these ends have a normal tendency toward the adjacent side bar 1, though this tendency is not sufficient to throw the plate into actual engagement with the side bar. The function of the plate 17 is to engage with the collars 13, and to hold said collars in their contracted positions.

Formed integral with, or rigidly secured to the upper ends of the collars 13, are the inwardly-extending hooks 19, to which the chains 20 are respectively connected. The chains 20 are two in number, one for each collar, and extend outwardly toward the openings 8 of the end pieces 2, where they pass over the pulleys 21. The pulleys 21 are one for each of the openings 8, and are revolubly journaled therein. From the pulleys 8 the chains 20 proceed toward each other, and have their remaining ends connected to a ring 22. The ring 22 is, in turn, connected to the chain or cable 23 of any suitable hoisting apparatus. This hoisting apparatus is not shown or described, since any of the devices common in the art may be used.

24 indicates two regulating chains, which are secured to the under sides of the collars 13, by means of the screws 16. The chains 24 are two in number, and each chain has one of its ends connected to one collar and the remaining end to the remaining collar, thereby producing an arrangement in which each collar has one end of each chain connected thereto. From the collars 13 the chains 24 proceed outwardly to the openings 4, where they pass around the pulleys 25 revolubly journaled in the openings 4 of the end pieces 2. By means of this arrangement the arms 12 are forced to move in unison with each other. When one arm is being extended the companion arm must of necessity operate similarly; and when one arm is being contracted the same operation must be performed by the remaining arm, as will be understood. Each outer end of the arms 12 is provided with a hook 26, which is formed with an upper portion 27, having an opening therein through which the arms may pass, and whereby the hooks are slidably mounted upon the arms.

28 indicates two set-screws, which are one for each hook 26, and which have for their purpose to adjustably secure the hooks in place. Each of the upper portions 27 is provided with integral flanges 29, which extend around the outer sides of the respective arms 12, but which are broken away on the inner sides, so as to leave said inner sides exposed at the points otherwise occupied by the flanges 29. From the upper portions 27 the hooks 26 extend downwardly and inwardly at right angles to the arms 12, so as to form the suspending spur 30, such spur being one for each hook and provided with a plate 31.

The plates 31 are rigidly secured to the inner sides of their respective suspending spurs and have their upper edges projecting a slight distance above the spurs, so as to form a track or way upon which a grooved pulley or wheel may operate. The inner ends of the plates 31 are bent inwardly and thence outwardly parallel with the spurs 30, so as to form the arms 32, which have for their purpose to secure the animal-supporting hooks in their places, and to prevent said hooks from falling off the hooks 26 when they have no weight applied to them.

The animal-supporting hooks are designated by the numeral 33, and consist of the hooks proper 34, connected by swivel joints to the frames 35, of the grooved wheels 36. The wheels 36 are adapted to operate upon the respective spurs 30, and to be held in place by the arms 32 of the plates 31, which lie on the outer side of each hook and prevent the same from tilting outwardly and falling off.

The purpose of the chains 20 is to support the elevating apparatus and to spread the arms 12, and this is effected by the drawing of the chains over the pulleys 21, which will move the collars 13 outwardly, and consequently the arms 12. By offsetting the pulleys 21, and openings 8, a more direct application of power is applied to the collars 13, thereby preventing the collars from binding against the side bars 1.

The guiding apparatus consists of two duplicate parts, respectively fixed to the beams or joists 37, which beams or joists are two in number and project out horizontally from the sides of the apartment in which the apparatus is operated. Fixed to the upper edges of the beams 37, and arising therefrom, are the braces 38, which are one for each beam and which have their upper ends bolted or otherwise rigidly secured to the guide plates 39. The guide plates 39 are one for each of the beams 37 and have their upper ends formed with the outwardly-projecting studs 40, while the plates below said studs extend downwardly to points just above the beams 38, where they curve to form the depression or seat 41. From the seats 41 the plates 39 proceed forwardly and horizontally to the ends of the beams 37, where they curve downwardly and rearwardly to form the inclined portion 42, they being secured to the similarly inclined ends of the beams 37 by means of screws or any other suitable and approved devices.

Fixed to the rear sides of the respective plates 39 are the brackets 43, which are two for each plate and which are located one directly below the beams 37, and one adjacent to the seats 41. The ends of the brackets 43 terminate in longitudinal alignment with the plates 39 and are there secured to the second guide plates 44, which guide plates, 44, are one for each of the plates 39 and extend parallel with the portions 42 thereof. Above the seats 41 the plates 44 extend upwardly and rearwardly and have their upper ends terminating just below the upper ends of the braces 38, such upper ends of the plates 44 being formed with a spring tendency toward the plates 39, which tendency causes them to engage said plates on their forward sides.

Rigidly secured to the inner or contiguous sides of the beams 37 are the tracks 45, which are the usual tracks of slaughtering or butchering establishments and which proceed to that portion of the building in which the cutting or dividing operation is performed. The forward ends of the tracks 45 are formed with the notches 46 therein, which are adapted to receive the beveled front ends of the plates 31, thereby forming a continuous track composed of the tracks 45 and plates 31. Rigidly secured to the sides of the beams 37 which have the tracks 45, are the guide plates 47, which are provided with inwardly-extending flanges adapted to engage the hooks 26 and to guide them into such a position as will align the plates 31 and tracks 45. The rear inclined portions of the guide plates 47 are provided to guide the hooks into their seats, while the front and bottom portions of the guide plates are provided to engage the hook when seated in position, and to steady the same. The plates 47 are so disposed, together with the seats 41, that the spurs 30 of the hooks 26 will be tilted inwardly, thereby causing the hooks 33, by means of their wheels 36, to roll off the plates 31 and onto the tracks 45, along which they may travel, as will be understood.

In the practice of my invention, the elevating and spreading apparatus is connected to the hoisting mechanism by means of the chain or cable 23. The extension arms 12 are next contracted so that they will be capable of being easily secured to the legs of the animal, the hooks 33 being connected to the legs of the animal and then mounted upon the plates 31 of the hooks 26. When this operation has been effected, the hoisting mechanism is caused to operate. As soon as the animal is lifted from the ground, his weight will cause the chains 20 to travel over their pulleys 21, and to move the collars 13 outwardly, which will result in a similar movement of the arms 12, and in a stretching or spreading of the animal's legs. As the elevating apparatus continues to move upwardly it will engage the inclined portions 42 of the guide plates 39, and will travel up said inclined portions and between the plates 39 and plates 44, until the seats 41 are reached. When this stage of the operation has been attained the elevating apparatus will drop back into engagement with the guide plates 47, thereby aligning the plates 31 and tracks 45, and simultaneously tilting the plates 31 so as to cause the animal to roll off of the hooks 26 and onto the tracks 45. When the animal has been dislodged from the elevating and spreading apparatus the hoisting movement is begun anew, whereupon the elevating and spreading apparatus will move up the vertical portions of the plates 39 and will snap past the upper ends of the guide plates 44, whereupon the elevating apparatus will be freed, so as to enable it to descend, sliding along the outer sides of the guide plates 44. When the elevating and spreading apparatus has been lowered to its primary position, the above described operation may be repeated until all of the animals have been hoisted.

The operation above described is that which will be pursued in large butchering and slaughtering establishments, but for ordinary butchering the tracks 45 and consequently the guiding apparatus, will not be necessary, and in this case the animal will be simply raised and operated upon in the immediate vicinity of the place raised. For this operation the elevating and spreading apparatus alone will be used; and, by attaching to the hooks 26 the supplemental hooks of Fig. 9, the animal may be connected thereto with perfect convenience.

Thus it will be seen that my invention comprises two separable parts which, while primarily adapted for joint use, are capable of separate use. The purpose of the studs 40, of the guide plates 39, is to arrest the elevating and spreading apparatus after it passes the plates 47.

It will be understood that the outer extremities of the arms 12 engage with the plates 39 and 47 and slide along the same. By means of the adjustable attributes with which the hooks 26 are endowed, they may be adjusted to suit the varying widths of tracks with which my improvements are used; and the purpose of the fragmentary flanges 29 is to form a shoulder on the upper portion 27 of the hooks 26, capable of bearing against the inner or contiguous edges of the plates 39, and steadying the movements of the elevating and spreading apparatus.

Having thus described my invention, I claim—

1. In an animal-elevating apparatus, the combination of a pair of rolling hooks adapted to have the animal fixed thereto, a device adapted to have the hooks removably mounted on it and to be hoisted in the performance of the elevating operation, a pair of rails or tracks, a guide-plate secured one to each rail or track, the guides being adapted to guide and support the device having the rolling hooks, whereby the hooks may be rolled upon the rails or tracks, substantially as described.

2. The combination of a pair of rails or tracks, a guide plate adjacent thereto, said guide plate being formed with a seat or depression therein and a vertical portion above said seat or depression, and a second guide plate having one portion parallel with a portion of the first guide plate and having its upper end yieldingly bearing against the upper portion of the first guide plate, substantially as described.

3. The combination of two beams or joists, a track or rail secured to each contiguous side thereof, rigid guide plates or cleats secured directly to each of the beams and adjacent to the front ends of the rails or tracks, a vertically-extending guide plate rigidly secured to each of the beams and having an inclined portion below the same, while the portion above the beams is formed with a seat and with a vertical extension, and a second vertical guide plate for each beam and having a portion extending parallel with the inclined portion of the first vertical guide plate, the remaining portion of the second vertical guide plate being engaged with the companion guide plate by a yielding pressure, substantially as described.

4. The combination of a pair of rails or tracks having oppositely-arranged terminals, said terminals being notched, an elevating apparatus adapted to be raised to the rails or tracks, and two hooks on said elevating apparatus, said hooks having short sections of rails or tracks thereon adapted to be fitted within the notches of the main rails or tracks when the elevating apparatus is raised to the level thereof, substantially as described.

5. The combination, in an elevating and spreading apparatus, of two parallel frame bars, spreading arms arranged between the said bars and capable of movement toward and from each other, a chain connected to the spreading arms and adapted to effect the spreading thereof, and two additional chains having their ends connected respectively to the spreading arms and each passing over a pulley rigid on the frame, whereby the spreading arms are made to move in unison, substantially as described.

6. The combination, in an elevating and spreading apparatus, of two spreading arms movable toward and from each other, means for spreading said arms, two chains having their ends respectively connected to each of the spreading arms, and a pulley for each of said chains and rigid on the frame of the apparatus, over which pulleys the chains respectively pass, whereby the arms are made to move in unison, substantially as described.

7. In an elevating and spreading apparatus, the combination of two parallel side bars rigid with each other and composing the frame of the apparatus, two spreading arms located between said bars and movable toward and from each other, means for spreading said arms, a collar rigidly secured to the inner end of each arm and embracing the side bars, and a spring secured to one of the side bars and adapted to engage the collars and hold them in place, substantially as described.

In testimony that I claim the foregoing as my own I have hereto affixed my signature in the presence of two witnesses.

JOHN EVARISTE PERL.

Witnesses:
JOHN H. SIGGERS,
GEO. C. SHOEMAKER.